US012715620B2

(12) United States Patent
Clemens

(10) Patent No.: US 12,715,620 B2
(45) Date of Patent: Aug. 25, 2026

(54) METHOD AND APPARATUS THAT USES PULSED, COUNTER-ROTATING PLASMAS TO EXTRACT USEFUL ENERGY FROM THE ZERO-POINT FIELD AND/OR TO MODIFY OR NULLIFY THE FORCES OF GRAVITY AND INERTIA, OR THE PROPERTIES OF MASS

(71) Applicant: David Brian Clemens, Westcliffe, CO (US)

(72) Inventor: David Brian Clemens, Westcliffe, CO (US)

( * ) Notice: Subject to any disclaimer, the term of this patent is extended or adjusted under 35 U.S.C. 154(b) by 596 days.

(21) Appl. No.: 18/123,988

(22) Filed: Mar. 21, 2023

(65) Prior Publication Data

US 2023/0253896 A1 Aug. 10, 2023

(51) Int. Cl.

| | |
|---|---|
| ***B64G 1/40*** | (2006.01) |
| ***H02N 11/00*** | (2006.01) |
| *F03G 7/10* | (2006.01) |

(52) U.S. Cl.

CPC ........... *B64G 1/409* (2013.01); *H02N 11/008* (2013.01); *F03G 7/135* (2021.08); *Y10S 415/916* (2013.01)

(58) Field of Classification Search

CPC ....... B64G 1/409; H02N 11/008; F03G 7/135; Y10S 415/916

See application file for complete search history.

(56) References Cited

FOREIGN PATENT DOCUMENTS

WO WO-0149084 A2 * 7/2001 ............. B64G 1/409

OTHER PUBLICATIONS

Elsevier—Arc rotation characteristics of a plasma centrifuge with a counter-rotating electrical discharge—2014 (Year: 2014).*

* cited by examiner

*Primary Examiner* — Jimmy T Vu

(57) ABSTRACT

Numerous patents have been granted for methods to extract useful zero-point energy (ZPE). However, these methods utilize the Casimir force, which is orders of magnitude too small to power an electrical grid. The method and apparatus described here uses counter-rotating mercury based plasmas pulsed with a high frequency, high voltage discharge to create a coherence with the zero-point field, allowing for unlimited extraction of ZPE, which may ultimately replace polluting fossil fuel derived energy. Mainstream physics models gravity as a curvature of space (general relativity), but there are profound problems with this model. An alternative model of gravity advanced by some physicists models gravity (and inertia) as an induced effect resulting from the interaction of ZPE with subatomic charge. By creating a coherence with the zero-point field, this method causes an interference with this interaction, allowing gravity and inertia to be engineered or nullified, representing a breakthrough in propulsion.

2 Claims, 3 Drawing Sheets

METHOD AND APPARATUS THAT USES PULSED, COUNTER-ROTATING PLASMAS TO EXTRACT USEFUL ENERGY FROM THE ZERO-POINT FIELD AND/OR TO MODIFY OR NULLIFY THE FORCES OF GRAVITY AND INERTIA, OR THE PROPERTIES OF MASS

REFERENCES CITED

U.S. Patent Documents

U.S. Pat. No. 6,477,028B1
U.S. Pat. No. 5,590,031A
U.S. Pat. No. 7,411,772B1
U.S. Pat. No. 7,379,286B2
U.S. Pat. No. 2,949,550
U.S. Pat. No. 3,018,394
U.S. Pat. No. 3,187,206
U.S. Pat. No. 1,652,921A

OTHER PUBLICATIONS

Wilson, H. A., "An Electromagnetic Theory of Gravitation," Phys. Rev. 17, 54-59 (1921)

Dicke, R. H., "Gravitation Without a Principle of Equivalence," Rev. Mod. Phys. 29, 363-376 (1957)

Brans, C., and Dicke, R. H., "Mach's Principle and a Relativistic Theory of Gravitation," Physical Review, Volume 124, Number 3, (1961)

Sakharov, A., Vacuum Quantum Fluctuations in Curved Space and the Theory of Gravitation. Soviet Physics-Doklady, Vol. 12, No. 11, 1040-1041, (1968)

Puthoff, H. E., Ground-state of Hydrogen as a Zero-Point-Fluctuation-Determined State Phys. Rev. D 35 3266-3269 (1987)

Puthoff, H. E., Gravity as a Zero-Point-Fluctuation Force. Phys. Rev. A 39, 2333-2342 (1989)

Haisch, B., Rueda, A. and Puthoff, H. E., Inertia as a Zero Point Field Lorentz Force. Phys. Rev. A 49, 678-694 (1994)

Fazi, Chris and Bahder, Thomas B., Force on an Asymmetric Capacitor, Army Research Laboratory ARL-TR-XXX (2003)

BACKGROUND OF THE INVENTION

The existence of zero-point energy (ZPE) was first postulated by Max Planck in 1912. ZPE is required by quantum theory, where the Heisenberg uncertainty principle mandates that there can never be a condition of no energy present. A pendulum operating at the quantum level will never come to a complete stop, and will have a minimum average energy as represented by hf/2, where h is Planck's constant and f is the oscillation frequency. This energy is referred to as "zero-point" because it is present even at a temperature of absolute zero, where all thermal activity ceases. The existence of ZPE has been experimentally confirmed by the Lamb Shift (for which Lamb was awarded the Nobel Prize) and the Casimir Effect. The Casimir force is powerful enough that operators of scanning electron microscopes must take special precautions to prevent metal surfaces in close proximity from joining together. Other evidence for the existence of ZPE includes the observation that helium remains a liquid at a temperature of absolute zero, impossible unless it is receiving some form of energy to keep it in a liquid state.

Zero-point energy is present at every point in the universe, being embedded in the fabric of space itself. In fact, it is becoming increasingly evident that ZPE is the energy that powers the universe itself, giving subatomic particles their energy. For example, an electron orbiting the nucleus of an atom would quickly radiate away its energy as Larmor radiation and crash into the nucleus unless it was receiving energy from an outside source to stabilize this orbit. That energy is ZPE, and the electron's interaction with ZPE can be seen with the Lamb Shift, where the ZPE perturbs or "jiggles" the electrons slightly, leading to a shift in frequency in transitions of quantum levels of about 1000 MHz.

Zero-point energy has an enormous energy density, once estimated by NASA to be anywhere from $10^{24}$ to $10^{58}$ Joules/$m^3$, although the exact figure is unknown due to the cutoff frequency of the zero-point fluctuations being unknown. Because of this enormous energy density, its unlimited supply, the ubiquitous and isotropic quality of ZPE and its non-polluting nature, ZPE would represent the ultimate form of useful energy for mankind if it could be harnessed. Within the scientific community, it is no longer a debate that burning fossil fuels for energy is responsible for rapid global warming, leading to wild climatic swings, droughts, floods, "superstorms," wildfires, dying oceans and rising sea levels from the rapid melting of glaciers. There could be catastrophic and irreversible global consequences if the burning of fossil fuels is not halted soon. The extraction of energy from the zero-point field represents the only realistic possibility for this to happen, and the method and apparatus described here is designed for this purpose.

In mainstream physics, gravity is modeled as a curvature of space (general relativity) and one of the four fundamental forces in nature. However, there are profound problems with this model. For over 100 years mainstream physics has tried to integrate this model with quantum theory ("quantum gravity") and has failed. Additionally, attempts to unify the theorized four fundamental forces in nature ("grand unification") have also failed. Mainstream physics currently maintains that the force of gravity has no proven connection to any of the other three "forces," although there is powerful evidence in the form of the "Biefeld-Brown effect" that gravity is electromagnetic in nature (i.e. U.S. Pat. Nos. 2,949,550, 3,018,394, 3,187,206). This evidence has either been ignored by the physics establishment or dismissed as nothing more than "ionic wind," although two US government physicists working for the Army Research Laboratory determined that the Biefeld-Brown effect force is at least three orders of magnitude too large to be accounted for by the ionic wind explanation. The effect also has been observed in a full vacuum at a NASA research facility, thereby negating the "ionic wind" theory.

Additionally, mainstream physics currently has no understanding of the origin of gravity, inertia and mass. Even if Higgs theory is correct, it can only account for approximately 2 percent of the mass of the atomic nucleus (quark mass). Furthermore, mainstream physics has no explanation for why the force of gravity cannot be shielded, why it is so weak, and why there is no negative mass. Regarding all of these problems, it is the hope of mainstream physicists that there will one day be new discoveries that solve all of these problems within the constraints of currently accepted theory. The other possibility, of course, is that these mainstream theories, including general relativity, are simply wrong, a possibility that one current mainstream theoretical physicist stated as being "too scary to contemplate." However, the astute student of the history of science would note that in every era of science, the contemporary scientists were supremely confident that their theories were absolutely correct, and yet those theories were ultimately found to be either profoundly incomplete or simply wrong.

For some time there has been an alternative theory of gravity that models it as an induced effect resulting from the interaction of the zero-point field with subatomic charge and thus not a fundamental force of nature. This theory of gravity solves all of the problems with the general relativity model in that since gravity is being generated at the subatomic level, it is already integrated with quantum theory, and does not need to be unified with the other alleged fundamental forces, because it is not such a force. The experimental observations used to support the general relativity model have an alternative explanation in this theory of gravity. For example, the bending of light rays near a massive body, rather than due to the curvature of space near this body, would result from a change in the refractive index of the dielectric constant of space itself, as a result of the intense interactions between the collective subatomic charge of the massive body with the electromagnetic fluctuations of the zero-point field that are embedded in the fabric of space. A rough analogy would be the observed “bending” of a stick inserted in water due to the increased density of the medium (water) through which the light is traveling. Additionally, the other observations about gravity such as why it cannot be shielded are answered by this theory. For example, the force of gravity cannot be shielded because it is generated by ZPE, which is embedded in the fabric of space, and space exists at every point and therefore cannot be isolated for shielding.

Some of the physicists involved with this alternative model of gravity also discovered that as with gravity, inertia results from an interaction between the zero-point field and the subatomic charges in the object that is being accelerated. This can be illustrated by remembering the fundamental discovery that allowed for the creation of electric motors: moving charges in the presence of a magnetic field produces a force. Therefore, the moving charges in the object experiencing acceleration interact with the magnetic fluctuations of the zero-point field, resulting in a force applied to the accelerating object. These physicists found that their equations regarding this interaction actually precisely derived Newton’s second law, F=ma.

In mainstream physics, the principle of equivalence states that inertial mass and gravitational mass are identical in strength. However, mainstream physics does not have an explanation as to why this is so. This alternate theory explains that it is because both inertia and gravity are being created by the interaction of matter with the zero point field.

Therefore, if gravity and inertia, and by extension, gravitational and inertial mass, are not intrinsic properties of matter, but rather are created by an extrinsic, external interaction with the zero-point field, it could be possible to eliminate the effect of both gravity and inertia in a vehicle by interfering with this interaction, resulting in a craft that could be accelerated to virtually unlimited speeds with little energy.

SUMMARY OF THE INVENTION

It is postulated here that there exists an ultimate fundamental particle that is the constituent of all matter. This particle is sized below that of the quark, and is possibly as small as the Planck length, and therefore would not be seen by any particle collider such as the Large Hadron Collider. This particle has as its fundamental property that of counter-rotating vortices, and will be referred to as the “Clemens” particle in order to have a unique search term to quickly identify any future references to the particle. This particle is the carrier particle for ZPE, and has a positive and negative form, manifested by opposite spin. In the positive form of the particle, the vortex extracts energy from the zero-point field, while the negative manifestation of the particle has its vortex acting as a corresponding sink for equilibrium purposes. These particles will spin-align in the presence of electromagnetic fields, according to polarity.

It is this property of spin-alignment in magnetic fields that allows for the random fluctuations of ZPE (which are mostly electromagnetic in nature) to be cohered for the purpose of extracting useful energy. Specifically, Prigogine was awarded a Nobel Prize for defining the conditions under which a system could change from randomness to coherence. These conditions are to drive a system far from equilibrium that is nonlinear in its dynamics and has an energy flux through the system. The method described here meets these three requirements. A plasma is nonlinear in nature, the pulsed, high-frequency, high-voltage discharges of the apparatus described represent the energy flux through the system, and the property of spin alignment in magnetic fields allows these particles to be driven far from their natural state of equilibrium (randomness).

The preferred method and apparatus uses counter-rotating mercury-based plasmas. The plasmas represent a nonlinear system, and the heavy molecular weight of mercury increases the vacuum polarization of the ZPE. These plasmas are pulsed with a high frequency, high voltage discharge (energy flux) in order to establish the plasmas and drive the Clemens particles out of equilibrium (randomness) by spin-aligning them with the counter-rotating EM fields. Useful energy can then be extracted through Faraday’s law by surrounding the rotating plasmas with coils and harvesting the electromagnetic energy through standard electrical engineering principles. Another means for extracting useful energy from this method and apparatus involves the conversion of extremely high levels of static charge into electrical current, again using standard electrical engineering principles.

The mercury is doped with thorium dioxide in order to lower the threshold of coherence with the zero-point field (see U.S. Pat. No. 1,652,921A). The device can possibly generate neutron radiation, which must be shielded with a cylindrical ceramic radiation shield covering the apparatus if the particular configuration being used is determined to be generating harmful levels of neutron radiation. No one should attempt to experiment with this method without checking for neutron radiation by using a functional neutron detector/counter. Once the plasmas are established and a true coherence with the zero point field is achieved, the rotation of the plasmas as well as the plasmas themselves should become self-perpetuating, drawing the necessary energy for this from the zero point field. This is somewhat similar to ball lightning, which is a self-contained plasma that has been observed in nature maintaining this plasma for extended periods of time.

By creating a coherence with the zero-point field and extracting ZPE, the extracted ZPE, which is responsible for creating inertia, gravity and by extension, mass, has been evacuated in local space and is no longer available to interact with the subatomic particles that constitute matter, resulting in a diminution or elimination of the forces of gravity and inertia, and properties of mass. Therefore, if the apparatus is of the proper size and power, a gravity, inertia and mass canceled envelope can be created in local space, and a vehicle could be accelerated to virtually unlimited speeds almost instantaneously, with very little energy input, with that energy being provided by the apparatus itself. Thrust and directional control can be provided by the Biefeld-Brown effect, powered by the enormous electrical energy extracted from the zero-point field. A separate patent will detail how this craft is constructed.

Regarding propulsion, it should be remembered that the so-called "speed of light barrier," more technically described as "relativistic mass increase," only applies to objects with mass. If a vehicle can create a mass-canceled envelope within which to operate, this so-called "speed of light barrier" does not apply, and theoretically unlimited speeds can be achieved.

DETAILED DESCRIPTION OF THE INVENTION

Figure 1:
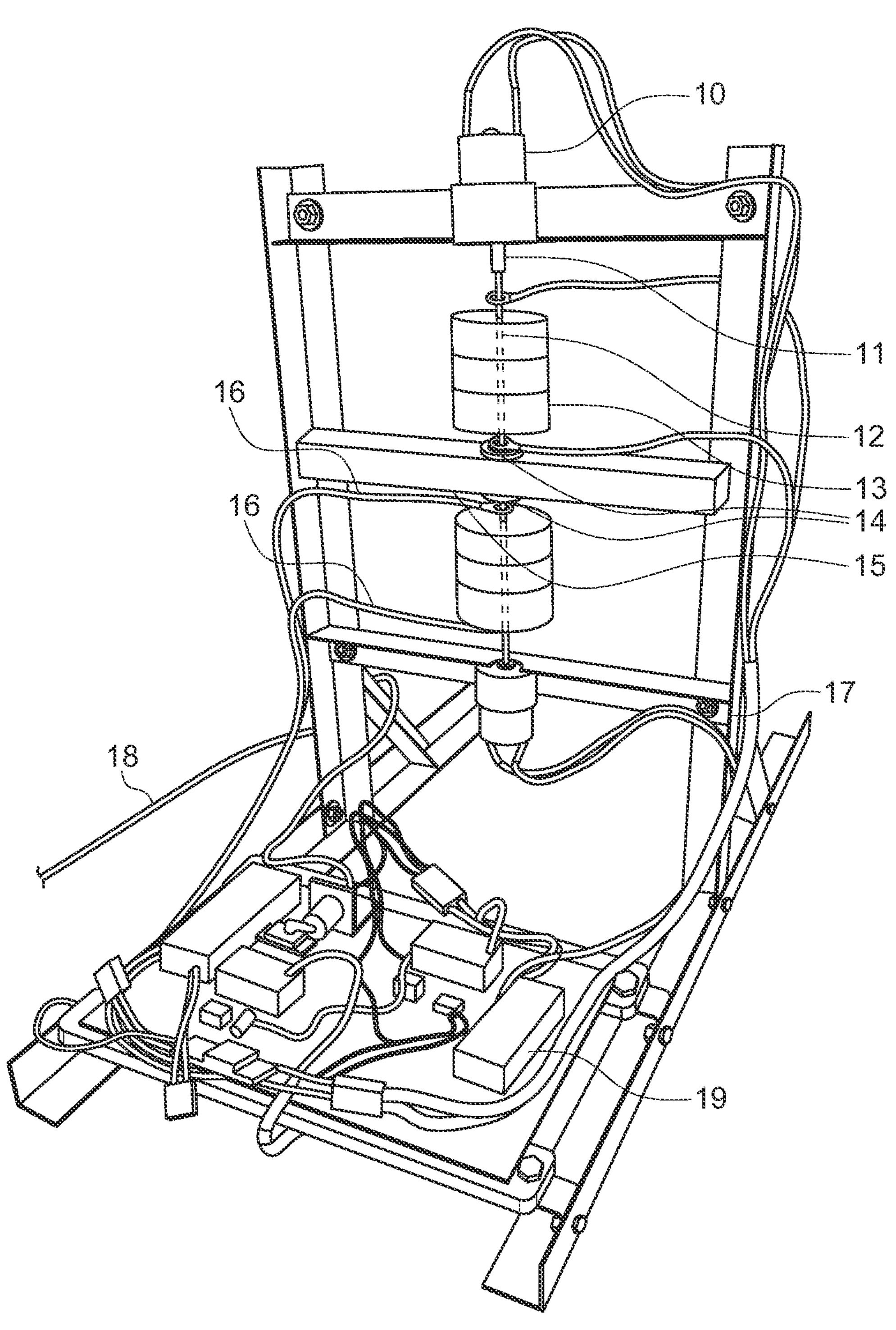
FIG. 1 depicts the first embodiment of the apparatus, where the two counter-rotating cylindrical plasma chambers are stacked one on top of the other, each mechanically driven by a motor.
Figure 2:
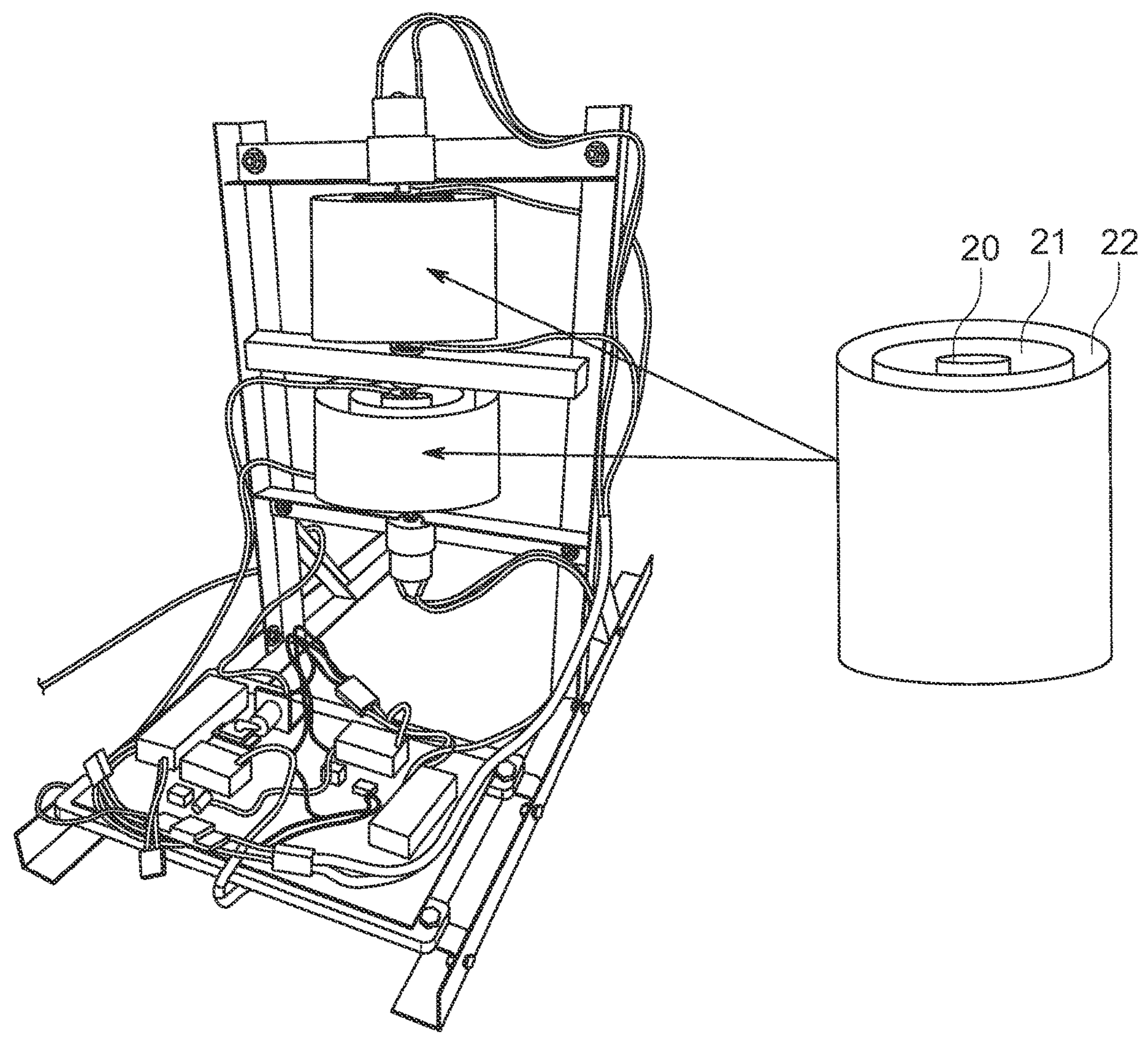
FIG. 2 depicts the apparatus described in FIG. 1, after the addition of the concentric cylinders that encompass each cylindrical plasma chamber and consist of an induction coil for the extraction of useful energy and a boron carbide neutron shield.
Figure 3:
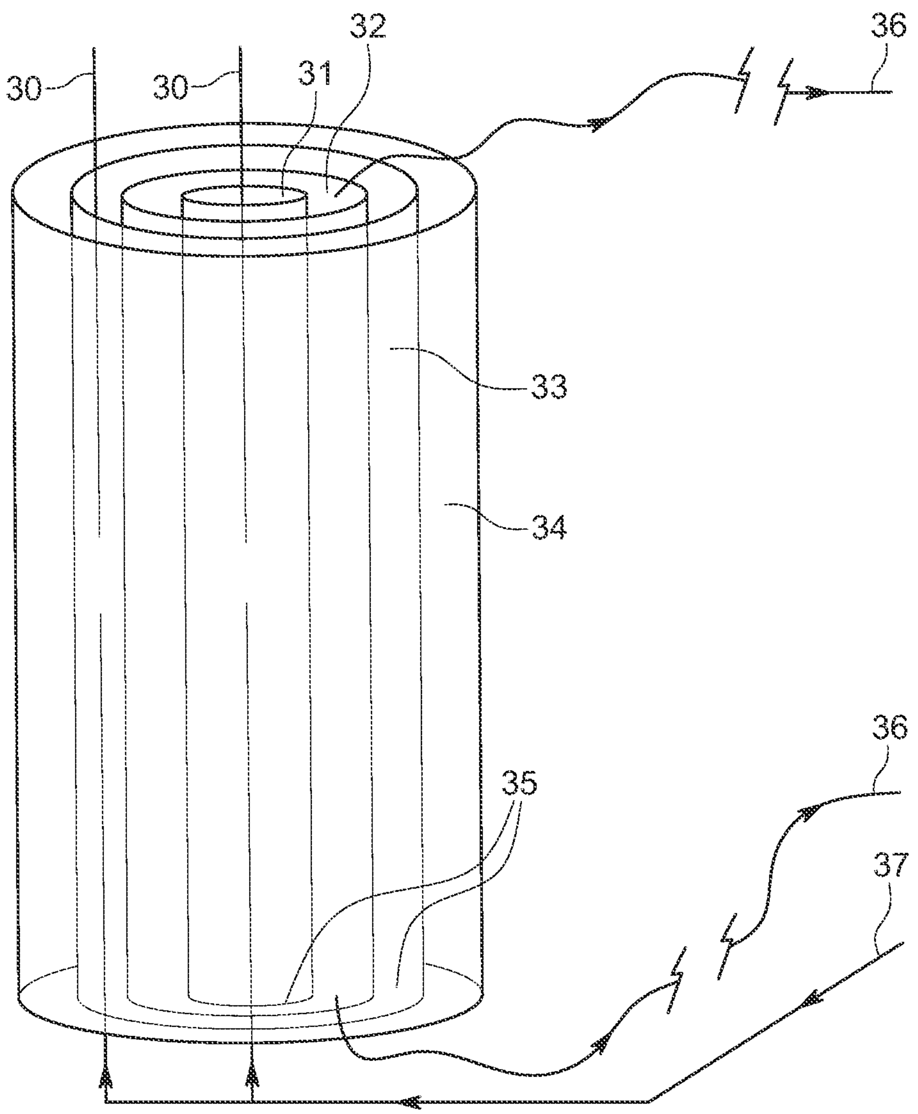
FIG. 3 depicts the preferred embodiment of the apparatus where there are no moving parts, and where the two counter-rotating plasmas are concentric, and in between these two plasmas are the induction coil, and in the final ring on the outside of the outer plasma there is a boron carbide neutron shield.

In the first embodiment of the apparatus, the two counter-rotating cylindrical plasma chambers (13) are stacked one on top of the other, each mechanically driven by a motor (10). These chambers are held in place by a support frame (17), with the bottom spindle/electrode (12) of the upper chamber resting in a bearing (14) on a dielectric crossmember (15). The lower chamber has its upper spindle resting on another bearing (14) in the bottom of the crossmember.

The interior of the plasma chambers consist of a 100% argon atmosphere evacuated to approximately 6 to 10 torr and contain mercury in an amount empirically determined based on the measurements of the plasma chambers and power output of the high-voltage, high-frequency discharges. This mercury is doped with thorium dioxide, at about three parts thorium to 100,000 parts mercury, by weight.

High torque motors drive each of the plasma chambers. The plasma chambers rotate at a speed that is determined empirically based on the dimensions of the device. The spindles, which couple to the drive motors dielectrically, also function as electrodes for the high-voltage, high-frequency discharges that pulse the plasmas. Brushes (16) attach to each spindle to energize the electrode function.

The high-voltage, high-frequency discharges are generated by circuitry that produce at least 150 kilovolts per plasma chamber, with the preferred voltage being in excess of 1 million volts, and have a pulse duration no greater than 100 microseconds. Each plasma chamber has its own separate circuitry for this purpose (19). The two rotating plasma chambers are encompassed by an induction coil (21) and neutron shield (22).

In the preferred embodiment, the two plasma chambers (31, 33) are concentric, with one plasma chamber inside the center of the second. In this embodiment, the plasmas are rotated non-mechanically, by energizing fixed biased electrodes located on the sides of the cylinders sequentially (35), by using common techniques familiar to researchers who need to rotate plasmas in controlled laboratory conditions. This technique also employs the use of fixed concentric magnets at the top and bottom of the plasma chambers to aid with the initial rotation of the plasmas. There are also electrodes protruding from the tops and bottoms of the chambers (30) in order to pulse the plasmas with the high-voltage, high-frequency electrical discharges. The gap distance of these electrodes determines the frequency of the discharges and is calculated empirically by the voltage output of the high-voltage, high-frequency discharge (37) equipment.

This embodiment has the induction coil (32) ideally positioned between the two counter-rotating plasmas, with the outer concentric cylinder consisting of the neutron shield (34).

The advantages of the preferred embodiment are twofold: a greater coherence with the ZPE field is obtained by having the two rotating plasmas in nearer proximity to each other than the stacked configuration, and the lack of any moving parts eliminates the possibility of a mechanical breakdown, making the apparatus extremely reliable. This extreme reliability, coupled with the self-perpetuating property of the plasma rotations once a coherence is established, makes this embodiment ideal for aerial or space propulsion applications where reliability must be nearly perfect.

I claim:

1. A machine for extracting useful energy from a zero point field, comprising:

a. a set of two counter-rotating plasma chambers, configured either concentrically or stacked vertically, b. a set of two electrodes in each said plasma chamber, whereby a way of rotating said plasma chambers using either drive motors for the stacked vertical configuration, or biased electrodes for the concentric configuration, c. a high voltage, high frequency pulse generator for each said plasma chamber, d. an induction coil of wire that surrounds each said plasma chamber, e. a neutron shield that surrounds each said plasma chamber and said coil, whereby said machine creates a coherence with the zero point field, allowing for the extraction of electrical energy by utilizing Faraday's law where moving magnetic fields generate electrical current in the wires of the coils.

2. A method that causes a nullification of the effects of gravity and inertia in local space, comprising:

a. an establishment of counter-rotating plasmas, b. said plasmas then being pulsed with a high voltage, high frequency discharge, c. said pulsed plasmas then creating a coherence with a zero point field, d. said coherence then causing an interference with a normal interaction between a subatomic charge of matter and the zero point field which generates gravity and inertia, whereby said interference causes an area in local space, a size of which is linear with voltage, to be free of the effects of gravity and inertia, and as a consequence the properties of mass, so that any vehicle or a spacecraft that is enveloped by this mass-canceled area instantaneously accelerates to virtually unlimited speeds, representing a breakthrough in propulsion.

* * * * *